(12) United States Patent
Nicole et al.

(10) Patent No.: US 10,798,878 B2
(45) Date of Patent: Oct. 13, 2020

(54) HORTICULTURE LIGHTING SYSTEM AND HORTICULTURE PRODUCTION FACILITY USING SUCH HORTICULTURE LIGHTING SYSTEM

(71) Applicant: PHILIPS LIGHTING HOLDING B.V., Eindhoven (NL)

(72) Inventors: Céline Catherine Sarah Nicole, Eindhoven (NL); Hangfeng Ji, Shanghai (CN); Cristina Tanase, Eindhoven (NL); Gabriel-Eugen Onac, Eindhoven (NL); Marc Andre Peters, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 441 days.

(21) Appl. No.: 14/425,384

(22) PCT Filed: Aug. 28, 2013

(86) PCT No.: PCT/IB2013/058071
§ 371 (c)(1),
(2) Date: Mar. 3, 2015

(87) PCT Pub. No.: WO2014/037852
PCT Pub. Date: Mar. 13, 2014

(65) Prior Publication Data
US 2015/0230409 A1    Aug. 20, 2015

Related U.S. Application Data

(60) Provisional application No. 61/696,532, filed on Sep. 4, 2012.

(51) Int. Cl.
*A01G 7/04* (2006.01)
*H05B 45/10* (2020.01)
(Continued)

(52) U.S. Cl.
CPC ............... *A01G 7/045* (2013.01); *A01G 9/14* (2013.01); *H05B 45/10* (2020.01); *H05B 47/11* (2020.01); *H05B 47/16* (2020.01); *Y02P 60/146* (2015.11)

(58) Field of Classification Search
CPC . A01G 1/00; A01G 1/001; A01G 7/00; A01G 7/04; A01G 7/045; A01G 9/00;
(Continued)

(56) References Cited

U.S. PATENT DOCUMENTS 5,269,093 A    12/1993  Horaguchi
5,323,567 A *   6/1994  Nakayama ............. A01G 7/045
                                                    47/63

(Continued)

FOREIGN PATENT DOCUMENTS

CN    101847023 A    9/2010
CN    102138464 A    8/2011
(Continued)

OTHER PUBLICATIONS

Photosynthetic photon flux density (Year: 2019).*
Morrow, Robert C. "LED Lighting in Horticulture", Hortscience, vol. 42, No. 7, 2008, pp. 1947-1950.

*Primary Examiner* — Thanh Pham
(74) *Attorney, Agent, or Firm* — Daniel J. Piotrowski

(57) ABSTRACT

The invention provides a lighting system comprising (i) a lighting device comprising a plurality of light sources for application in a horticulture production facility, wherein the light sources are configured to illuminate with horticulture light crops, wherein the lighting system further comprises (ii) a control unit configured to control the light intensity of local light at a location, wherein the local light is the sum of the horticulture light and light at the location originating from an optional other light source, and wherein the control unit is configured to prevent a change in the photosynthetic (Continued)

photon flux density (PPFD) of the local light at the location of on average more than 50 μmol/sec/m² over a predetermined period of time selected from the range of equal to or smaller than 5 minutes by controlling the contribution of the horticulture light to the local light.

11 Claims, 7 Drawing Sheets

(51) Int. Cl.
    *H05B 47/11* (2020.01)
    *H05B 47/16* (2020.01)
    *A01G 9/14* (2006.01)

(58) Field of Classification Search
    CPC ... A01G 9/14; A01G 9/20; A01G 9/24; A01G 9/26
    See application file for complete search history.

(56) References Cited

U.S. PATENT DOCUMENTS

| | | | | |
|---|---|---|---|---|
| 5,677,603 A * | 10/1997 | Speirs | ............... | B64D 11/00 |
| | | | | 315/324 |
| 5,818,734 A | 10/1998 | Albright | | |
| 2004/0109302 A1 * | 6/2004 | Yoneda | ............... | A01G 7/045 |
| | | | | 362/2 |
| 2007/0159833 A1 | 7/2007 | Netzel, Sr. | | |
| 2007/0216615 A1 | 9/2007 | Itoh | | |
| 2010/0031562 A1 | 2/2010 | Browne | | |
| 2010/0076620 A1 | 3/2010 | Loebl | | |
| 2010/0277078 A1 | 11/2010 | Morton | | |
| 2010/0281771 A1 * | 11/2010 | Kudo | ............... | A01G 7/045 |
| | | | | 47/58.1 LS |
| 2011/0088314 A1 | 4/2011 | Jacobs | | |
| 2011/0115385 A1 | 5/2011 | Waumans | | |
| 2011/0125296 A1 | 5/2011 | Bucove | | |
| 2011/0179706 A1 * | 7/2011 | Hunt | ............... | A01G 7/045 |
| | | | | 47/58.1 LS |
| 2012/0218750 A1 | 8/2012 | Klase | | |
| 2012/0293993 A1 | 11/2012 | Pan | | |
| 2013/0139437 A1 * | 6/2013 | Maxik | ............... | H05B 37/02 |
| | | | | 47/58.1 LS |

FOREIGN PATENT DOCUMENTS

| | | |
|---|---|---|
| CN | 102164438 A | 8/2011 |
| CN | 102577886 A | 7/2012 |
| CN | 102626042 A | 8/2012 |
| EP | 1639884 A1 | 3/2006 |
| JP | 9172868 A | 7/1997 |
| JP | 2010004869 A | 1/2010 |
| JP | 2012125204 A | 7/2012 |
| WO | WO2008048080 A1 * | 4/2008 |
| WO | 2010066042 A1 | 6/2010 |

* cited by examiner

HORTICULTURE LIGHTING SYSTEM AND HORTICULTURE PRODUCTION FACILITY USING SUCH HORTICULTURE LIGHTING SYSTEM

CROSS-REFERENCE TO PRIOR APPLICATIONS

This application is the U.S. National Phase application under 35 U.S.C. § 371 of International Application No. PCT/IB2013/058071, filed on Aug. 28, 2013, which claims the benefit of U.S. Provisional Patent Application No. 61/696,532, filed on Sep. 4, 2012. These applications are hereby incorporated by reference herein.

FIELD OF THE INVENTION

The invention relates to a horticulture lighting system and horticulture production facility using such horticulture lighting system.

BACKGROUND OF THE INVENTION

Horticulture lighting is known in the art. US2010031562, for instance, describes a lighting installation for use in greenhouse farming for lighting crops in a greenhouse, comprising a number of light sources, such as lamps, provided above the crops to be lighted, and a number of dimmer devices for the light sources, characterized in that the dimmer devices are provided with control means for periodically, automatically varying the light intensity of the light sources cooperating with the dimmer devices according to a predetermined pattern. US2010031562 aims to provide a method and lighting installation, respectively, for greenhouse farming. In particular, the light sources are divided into a number of groups, the lighting installation being designed such that, in use, the power of each group varies according to a predetermined pattern, while patterns of different groups are phase-shifted relative to each other such that the electric power consumed by the joint groups varies less than the sum of the power variations of the separate groups, more particularly such that the electric power consumed by the joint groups varies less than the power variation of a single group, more particularly still such that the electric power consumed by the joint groups varies to a smallest possible extent, or does, at least virtually, not vary. In particular, all patterns are the same, but only phase-shifted relative to each other.

SUMMARY OF THE INVENTION

Plants use the process of photosynthesis to convert light, $CO_2$ and $H_2O$ into carbohydrates (sugars). These sugars are used to fuel metabolic processes. The excess of sugars is used for biomass formation. This biomass formation includes stem elongation, increase of leaf area, flowering, fruit formation, etc. The photoreceptor responsible for photosynthesis is chlorophyll. Apart from photosynthesis, also photoperiodism, phototropism and photomorphogenesis are representative processes related to interaction between radiation and plants:
 photoperiodism refers to the ability that plants have to sense and measure the periodicity of radiation (e.g. to induce flowering),
 phototropism refers to the growth movement of the plant towards and away from the radiation, and
 photomorphogenesis refers to the change in form in response to the quality and quantity of radiation.

Two important absorption peaks of chlorophyll a and b are located in the red and blue regions, especially from 625-675 nm and from 425-475 nm, respectively. Additionally, there are also other localized peaks at near-UV (300-400 nm) and in the far-red region (700-800 nm). The main photosynthetic activity seems to take place within the wavelength range 400-700 nm. Radiation within this range is called photosynthetically active radiation (PAR).

Other photo sensitive processes in plants include phytochromes. Phytochrome activity steers different responses such as leaf expansion, neighbor perception, shade avoidance, stem elongation, seed germination and flowering induction. The phytochrome photo system includes two forms of phytochromes, Pr and Pfr, which have their sensitivity peaks in the red at 660 nm and in the far-red at 730 nm, respectively.

In horticulture, the photosynthetic photon flux density (PPFD) is measured in number of photons per second per unit of area (in $\mu mol/sec/m^2$; a mol corresponding to $6 \cdot 10^{23}$ photons). In practice, when applying e.g. inter-lighting (see below), especially for tomatoes, the red PPFD used may be typically 200 $\mu mol/sec/m^2$ and the ratio blue:red may be typically 1:7 (with red and blue ranging from 625-675 nm and from 400-475 nm respectively). Especially, the photosynthetic photon flux density may comprise about 10% blue and about 90% red. The PPFD can be determined from a photodiode or measured directly with a photomultiplier. The area in the PPFD refers to the local light receiving (plant) area of the space wherein the light source(s) are arranged. In case of a multi-layer system, it is the area of a relevant layer comprised in the multi-layer configuration; the PPFD may then be estimated in relation to each layer individually (see further also below). The area may be a value in an embodiment fed to the control unit manually, or may in an embodiment be evaluated (with e.g. sensors) by the control unit.

Plant growth depends not only on the amount of light but also on spectral composition, duration, and timing of the light on the plant. A combination of parameter values in terms of these aspects is called "light recipe" for growing the plant (herein, the words plant and crop can be interchanged).

LEDs can play a variety of roles in horticultural lighting such as:
1. Supplemental lighting: Lighting that supplements the natural daylight is used in order to increase production (of tomatoes for example) or extend crop production during e.g. the autumn, winter, and spring period when crop prices may be higher.
2. Photoperiodic lighting: The daily duration of light is important for many plants. The ratio of the light and dark period in a 24 hour cycle influences the blossoming response of many plants. Manipulating this ratio by means of supplemental lighting enables regulating the time of blossoming.
3. Cultivation without daylight in plant factories.
4. Tissue culture.

For providing supplemental lighting during autumn, winter and spring in green-houses (or all-year round in multi-layer growth), in general high-power gas-discharge lamps are used that have to be mounted at a relative high location above the plants to ensure sufficiently uniform light distribution across the plants. At present, in green houses different types of high power lamps ranging from 600 up to 1000 W (e.g. high power HID) are used to provide plants with supplemental light. One drawback is that from the location above the plants the amount of light reaching the lower parts of the plant may be rather limited, dependent upon the type of crop. At the same time, the lower parts of the plant are often most in need of supplemental light. The same dilemma persists when using solid state lighting that is mounted above the plants. Nevertheless, LED lighting, especially solid state lighting, has some advantages over discharge based lighting.

When plants experience any sudden changes in the environment, this translates to a certain stress level inhibiting efficient photosynthesis. This also applies to sudden light stress which may occur every time when supplementary lighting is used. Light changes occur as well naturally when clear sky changes to overcast weather. It has been shown that light induced stress can produce photo inhibition. An excess of light is the most common stress related to plants, however, sudden light interruptions causes stress on the plants as well. This especially was observed when the plant is flowering.

For example, in a greenhouse with supplementary lighting, artificial light sources will be turned on (or off or be dimmed) automatically (based on light sensors and certain algorithms) or manually, or according to a specific light recipe. When this happens, plants will suddenly receive more (or less) light and they have to adjust their rate of photosynthesis and other processes accordingly to accommodate this sudden change. This kind of stress is even worse in an environment when the artificial light is the only light source, such as in a tissue culture room (or multi-layer horticulture production facility). Similar effect occurs with turning off the light.

Hence, it is an aspect of the invention to provide an alternative lighting system and/or an alternative horticulture production facility (such as a greenhouse or multi-layer system) including (and using) such alternative lighting system, which preferably further at least partly obviate one or more of above-described drawbacks. It is especially the intention of this invention to reduce the plant stress generated by sudden changes in the artificial lighting or natural daylight by adding a feature in the (lighting) control unit that may amongst others follow or mimic the daylight rhythm and cardinal directions. It is especially the intention to exclude here the stress due to ((sudden) changes to) high or low light conditions.

Hence, in a first aspect, the invention provides a lighting system comprising (i) a lighting device comprising a plurality of light sources for application in a horticulture production facility comprising said lighting device, wherein the light sources are configured to illuminate with horticulture light crops within said horticulture production facility, wherein the lighting system further comprises (ii) a control unit which is configured to control the light intensity of local light at a location within the horticulture production facility, wherein the local light is the sum of the horticulture light and optional light at the location originating from an optional other light source, and wherein the control unit is configured to prevent a change in the photosynthetic photon flux density (PPFD) of the local light at the location within the horticulture production facility of on average more than 50 µmol/sec/m$^2$ (threshold or threshold value), such as on average more than 20 µmol/sec/m$^2$, especially on average more than 5 µmol/sec/m$^2$, over a predetermined period of time selected from the range of equal to or smaller than 5 minutes, such as 5 minutes, or even selected from the range of equal to or smaller than 2 minutes, such as 1 minute, by controlling the contribution of the horticulture light to the local light, wherein the photosynthetic photon flux density (PPFD) is measured in total number of photons (emitted by the lighting device and the optional other light source(s)) per second per unit of a local light receiving area. Hence, when a change in the photosynthetic photon flux density (PPFD) of the local light at the location within the horticulture production facility of on average more than 50 µmol/sec/m$^2$ within the indicated predetermined period of time is observed or expected, the control unit may try to compensate this by controlling the contribution to the local light.

In terms of plant factories where most often plants or crops are grown in multiple shelves/racks across multiple floors, the "local light receiving area" may be defined as the effective plant production area of the horticulture production facility, e.g. the base area of a shelf (of which a multiple may be present in the factory).

In terms of greenhouses for high wire crop growth, often inter-lighting is used, i.e. supplemental lighting in between the crops or plants, to illuminate areas of the plant that are difficult to illuminate from the top using natural outdoor light and/or artificial light. In the case of inter-lighting the "local light receiving area" is the vertical area of the plants illuminated with the inter-lighting. This vertical area is especially the area of a plane with a height which is the mean height of the plants in the row in a specific plant row and a length which is the length of the plant row. Hence, this can be seen as a cross-sectional vertical planar area parallel to the row of the plants or crops.

In terms of greenhouses where substantially only top lighting is applied, optionally in combination with solar light, or substantially based on solar light, the local light receiving area may be the effective plant production area of the base area.

Hence, in greenhouses the local light receiving area may be defined as the vertical area of the plants illuminated with the inter-lighting, especially with respect to those light source(s) and optional other light source that are configured to substantially illuminate vertically. However, would there be also one or more other light source(s), such as top-lighting light sources, the local light receiving area for those light sources may be defined as the effective plant production area of the base area.

The term "local light receiving area" may in an embodiment refer to a plurality of such areas, for instance a greenhouse with a plurality of rows, with each row having its respective local light receiving area. Hence, a local light receiving area may be divided into two or more subareas. For instance, when more than one sensor may be applied to monitor the local light (intensity and/or spectral distribution), it may be desirable to divide the local light receiving area in more than one or more subareas, respectively (which each subarea being monitored by at least one sensor).

Herein, the term "horticulture production facility" may refer to a greenhouse or a multi-layer production facility (or multi-layer plant factory). Such horticulture production facility may substantially apply daylight as light source and optionally supplemental light, as will in general be the case in greenhouses, or may substantially use artificial light as light source, as will in general be the case in multi-layer facilities. A greenhouse may thus be seen as a type of single-layer plant factory In yet a further aspect, the invention provides a horticulture production facility comprising a lighting system as defined herein, the lighting system especially comprising (i) a lighting device comprising a plurality of light sources configured within the horticulture production facility, wherein the light sources are configured to illuminate with horticulture light crops within said horticulture production facility, wherein the lighting system further comprises (ii) a control unit which is configured to control the light intensity of local light at a location within the horticulture production facility, wherein the local light is the sum of the horticulture light and light at the location originating from an optional other light source, and wherein the control unit is configured to prevent a change in the photosynthetic photon flux density (PPFD) of the local light at the location within the horticulture production facility of on average more than 5 µmol/sec/m² (threshold) over a predetermined period of time selected from the range of equal to or smaller than 5 minutes, or even equal to or smaller than 2 minutes, by controlling the contribution of the horticulture light to the local light, wherein the photosynthetic photon flux density (PPFD) is measured in total number of photons (emitted by the lighting device and the optional other light source) per second per unit of a local light receiving area (such as e.g. the effective base area of a greenhouse wherein top lighting is applied).

In yet a further aspect, the invention provides the use of a method of providing horticulture light to a crop in a horticulture production facility comprising providing said horticulture light (for instance from the herein described lighting system) to said crop, wherein when the light intensity of the horticulture light is changed, this change only occurs by gradually increasing or decreasing (the light intensity of the horticulture light) with time.

The invention may overcome the following problems or disadvantages:
1. Plants experience stress when artificial light sources are suddenly turned on and off.
2. In the presence of natural daylight in greenhouse environment, plants experience different light settings as they are on the North or South or East or West side of the greenhouse (cardinal positions). Those light settings differences get higher when artificial light is controlled regardless of daylight changes in intensity.
3. Similarly, LED chips experience stress (e.g., thermal and mechanical stress) at the moment of large current changes, e.g., from 0 mA to 350 mA. The stress is considered to affect the lifetime of the LED chips (and maybe other electronics components as well), and therefore potentially shortens the lifetime of LED lamps or modules.

Advantageously, the invention provides a lighting system as well as the use of a method to cope with sudden (large) interruptions of light to the crop, by providing supplemental light during such interruption. The invention also provides a lighting system as well as the use of a method to increase or decrease the horticulture light intensity (in terms of PPFD) in a gradual way. The above-mentioned problem(s) may be solved with this lighting system as well as this use of a method, especially in combination with a light sensor and a (remote) controlled lighting system.

If there are no other light sources than those of the lighting device or lighting system, so only horticulture light is provided, then, when changing the horticulture light intensity level this will be controlled to be in only small steps. However, in case there are other sources of light, then light intensity levels may (also) change due to fluctuations in the light of the other light sources, and then the changes in the horticulture light intensity level may be large, to compensate the fluctuations in the light of the other light sources. For instance: a built-in control loop with external set point; if the external set point remains constant, then soft start/stop is omitted and changes are implemented immediately (for instance a cloud taking away solar light). Alternatively, or in addition, if the external (recipe) set point for a horticulture light module is changed, the built-in control loop may need to perform a soft start/stop adjustment, possibly with a configurable time constant. Hence, with the invention better and/or quicker horticulture products may be obtained in an economic way, as plant stress may be prevented or reduced. Therefore, the term "change" especially relates to one or more of a reduction or increase in intensity due to a reduction respectively increase of the optional light of the optional light source, an increase in intensity due to an increase in the horticulture light intensity and a decrease in intensity due to a decrease in the horticulture light intensity.

The term "horticulture" relates to (intensive) plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs). The term "crop" is used herein to indicate the horticulture plant that is grown or was grown. Plants of the same kind grown on a large scale for food, clothing, etc., may be called crops. A crop is a non-animal species or variety that is grown to be harvested as e.g. food, livestock fodder, fuel, or for any other economic purpose. The term "crop" may also relate to a plurality of crops. Horticulture crops may especially refer to food crops (tomatoes, peppers, cucumbers and lettuce), as well as to plants (potentially) bearing such crops, such as a tomato plant, a pepper plant, a cucumber plant, etc. Horticulture may herein in general relate to e.g. crop and non-crop plants. Examples of crop plants are Rice, Wheat, Barley, Oats, Chickpea, Pea, Cowpea, Lentil, Green gram, Black gram, Soybean, Common bean, Moth bean, Linseed, Sesame, Khesari, Sunhemp, Chillies, Brinjal, Tomato, Cucumber, Okra, Peanut, Potato, Corn, Pearlmillet, Rye, Alfalfa, Radish, Cabbage, Lettuce, Pepper, Sunflower, Sugarbeet, Castor, Red clover, White clover, Safflower, Spinach, Onion, Garlic, Turnip, Squash, Muskmelon, Watermelon, Cucumber, Pumpkin, Kenaf, Oilpalm, Carrot, Coconut, Papaya, Sugarcane, Coffee, Cocoa, Tea, Apple, Pears, Peaches, Cherries, Grapes, Almond, Strawberries, Pineapple, Banana, Cashew, Irish, Cassava, Taro, Rubber, Sorghum, Cotton, Triticale, Pigeonpea, and Tobacco. Especial of interest are tomato, cucumber, pepper, lettuce, water melon, papaya, apple, pear, peach, cherry, grape, and strawberry.

Horticulture crops may especially be grown in a greenhouse, which is an example of a horticulture production facility (or horticulture factory). Hence, the invention especially relates to the application of the lighting system and/or the (use of the) method in a greenhouse or other horticulture production facility. The lighting device, or more especially the plurality of light sources, may be arranged between plants, or between plants to be, which is referred to as "inter-lighting". Horticulture growth on wires, like tomato plants, may be a specific field of application for inter-lighting, which application may be addressed with the present device and method. The lighting device, or more especially the plurality of light sources, may also be arranged over the plants or plants to be. Combinations of configurations of light sources, such as in between the crops (inter-lighting) and over the crops, may also be applied. Hence, in embodiments the light sources are configured over the crops, or between the crops, or over and between the crops.

Especially when horticulture crops are grown in layers on top of each other, artificial lighting is necessary. Growing horticulture crops in layers is indicated as "multi-layer growth" and may take place in a (multi-layer growth)

horticulture production facility. Also in multi-layer growth horticulture production facility, the lighting system and/or method may be applied.

In embodiments, such horticulture application comprises a plurality of said lighting devices, wherein said lighting devices are optionally configured to illuminate crops substantially horizontally within said horticulture production facility (such as by inter-lighting).

In another embodiment, the horticulture production facility comprises multiple layers for multi-layer crop growth, the horticulture application further comprising a plurality of said lighting devices, configured for lighting the crops in said plurality of layers.

The term "horizontal" in relation to the illumination refers to a (substantial horizontal arrangement of the optical axis of the illumination beam generated by the light source or lighting device). The term "horizontal" may refer to "substantially horizontal", with slight deviations, like within 10°, especially within 5°, such as within 1°, from the earth's surface.

The horticulture production facility has a base area. Especially in the case of top lighting, the fluence or photosynthetic photon flux density (PPFD) (in $\mu mol/sec/m^2$) (see also above), relates in this invention to the photons generated by the (total installed number of) light sources within the horticulture production facility (able to illuminate the respective local light receiving area) and optional photons originating from other (optional) light sources, such as especially the sun. The photosynthetic photon flux density may thus in such embodiment be defined relative to the effective plant production area of the base area (effective plant production area).

In case of a multi-layer system, this may relate to the area of a multi-layer. Light from optional other light sources, including the sun, may also be included. Hence, the PPFD can be seen as the sum of all photons that are generated and received per second, divided by the local light receiving area of the horticulture production facility.

As indicated above, especially in the case of inter-lighting, the fluence or photosynthetic photon flux density (PPFD)(in $\mu mol/sec/m^2$) (see also above), relates in this invention to the photons generated by the (in an embodiment total installed number of) light sources within the horticulture production facility (able to illuminate the respective local light receiving aria) and optional photons originating from other (optional) light sources (able to illuminate the respective local light receiving aria), wherein the area of the vertical plane of the row with plants is chosen (as relevant local light receiving area).

The photosynthetic photon flux density is measured or determined for a specific wavelength range, see also below.

Of course, the phrase "photons generated by the (total installed) number of light sources within the horticulture production facility" relates to the number of photons from functional light sources, i.e. light sources that are configured within the horticulture production facility to provide light to the crops (plants), and not light sources which are in this context not functional, like a control lamp of an electronic unit, or a lamps in control rooms, etc. Hence, the phrase "the light sources are configured to illuminate with horticulture light crops" indicates that the light sources of the lighting system have as function to illuminate the crops, either permanently, or semi-permanently (e.g. day-night schedule) or only during periods when there is temporarily a (by the control unit) perceived intensity deficiency. Of course, the light sources may both be configured to illuminate with horticulture light crops, even in addition to the optional light, and may be configured to compensate for undesired large intensity drops.

The optional other light source, may especially be the sun. Referring to greenhouses, they have often light transmissive roofs and/or walls. Hence, also solar light may illuminate the crops. Therefore, the local light is the sum of the horticulture light and light at the location originating from an optional other light source (see further also below). The phrase "optional other light source" may also refer to a plurality of such sources. For instance, the solar light may contribute, but also other light sources, not part of the lighting system or lighting device, may also contribute (if present in the horticulture production facility). As indicated herein, the optional other light source may be the sun but may optionally or additionally also include an inspection light source. Especially in plant factories wherein substantially artificial lighting is applied, also one or more inspection light sources may be present. Too large changes in the intensity of the solar light and/or inspection light may therefore also be compensated, especially too large drops in intensity of the light of such light source(s).

Hence, the photon flux density also relates to the contribution of such other light source(s). However, in some embodiments, such other optional light source(s) may not be present. For instance, referring to a multi-layer horticulture production facility, most, or all crops, may not receive any daylight, and may only be illuminated by the light of the light sources of the lighting device (and optional other non-solar light sources). Of course, inspection light might be present.

The horticulture production facility may be divided in different locations (or areas). For instance, each light source, or a subset of light sources, is especially configured to provide lighting in a specific location (of the horticulture production facility or horticulture factory). The term "location" is used to indicate part of the area that is used to grow the horticulture crops. Further, the horticulture production facility, especially a greenhouse, may comprise locations that receive more daylight than others, or are subject to less or more daylight changes than others. It is for instance referred to the cardinal positions of locations within the horticulture production facility. Dependent upon for instance predetermined settings and/or the presence of a plurality of sensors, a plurality of locations may be defined. However, this does not exclude the definition of the whole interior of the horticulture production facility as single location, though in general it may be desirable to define a plurality of locations to be able to locally prevent stress of plants. In such instances, it may be desirable to control the intensity (and optionally spectral light distribution; see also below), of the light at such location, i.e. the local light. As will be clear to the person skilled in the art, the local light is the sum of the horticulture light and light at the location originating from an optional other light source, such as the sun.

As indicated above, it is desirable that the light intensity does not fluctuate too much (in short time periods). A very short fluctuation (with a return to the original level) may not be observed by the plants, and may thus not lead to stress. Further, fluctuations on a large time scale may be adaptable for the plant. However, fluctuations with a substantial increase or reduction in light intensity (and/or spectral light distribution) may lead to plant stress. It appears that a change in the photosynthetic photon flux density (PPFD) of the local light of on average more than 50 $\mu mol/sec/m^2$, especially on average more than 20 $\mu mol/sec/m^2$, even more especially on average more than 5 $\mu mol/sec/m^2$, over a predetermined period of time selected from the range of equal to or smaller than 5 minutes may lead to plant stress.

To give some examples of such situations, one may think of switching on the lighting device to a level of 200 µmol/sec/m², and maintaining this level for at least one hour. Such switching on occurs within micro seconds and thereafter, the light intensity stays constant; hence, the predetermined period of time is smaller than 5 minutes, and the change is much more than 50 µmol/sec/m². Hence, such situation may lead to plant stress, and the control unit may therefore, when perceiving or expecting such large change, impose a gradual ramping up to this level. For instance, when increasing to this level in 1 h, the increase in time is 16.7 µmol/sec/m² per 5 minutes, which might be acceptable, or even safe (see also below).

As will be clear to a person skilled in the art, the lighting system cannot create "darkness". Hence, would there be for one or another reason an external source that suddenly adds substantially to the local light, then the system may not be able to compensate such (sudden) increase in light. Would there however be a (sudden) decrease in the contribution to the local light by such optional (external) light source, the lighting system may be able to compensate by increasing the intensity of the light of the light source(s) of the lighting device contributing to the local light i.e. at the location.

The predetermined time may e.g. be dependent upon the type of crops grown. Some crops may try to adapt quick to light changes; in such instances, the predetermined time may be chosen short, such as 0.5 minute. Other types of crops may respond relative slow, and the predetermined time may be chosen to be e.g. 1 minutes. In general, the predetermined time may be selected from the range of 0.5-5 minutes, especially 1-5 minutes.

Especially, the invention deals with situation wherein there is a change from one semi-permanent intensity level to another semi-permanent intensity level of the local light. Hence, the control unit may especially be configured to prevent such change of on average more than 50 µmol/sec/m², which change within 5 minutes occurs, (and is semi-permanent on a time scale of longer than 5 minutes. The following is meant hereby: assume a first level which is constant (or which fluctuates within the indicated range), which first PPFD level lasts for more than 5 minutes; this level is followed by a second PPFD level, which is also constant (or which fluctuates within the indicated range), and which is on average more than 50 µmol/sec/m² larger or smaller than the first level. When the change from the first level to the second level would occur within the 5 minutes predetermined period of time (assuming a 5 minutes predetermined period of time), then the lighting system is configured to compensate this (as far as this is technically possible). When the change from the first level to the second level would occur on a time scale larger than the 5 minutes predetermined period of time (or other predetermined period of time), then the lighting system may be configured to allow this without intervention.

To give another illustrative example: assume a first level which is constant (or which fluctuates within the indicated range), which first PPFD level lasts for more than 5 minutes; this level is at a certain moment in one step changed to a second PPFD level, which is also constant (or which fluctuates within the indicated range), and which is on average less than 50 µmol/sec/m² larger or smaller than the first level. Assume further that the change from the first level to the second level includes a spike within a few seconds well above the predetermined level, then the system may not intervene (assuming again a predetermined period of time selected to be 5 minutes), as over the predetermined period of time the change in intensity was smaller than the predetermined PPFD of 50 µmol/sec/m².

Likewise, in a specific embodiment, the control unit may especially be configured to prevent such change of on average more than 50 µmol/sec/m², which change (within 2, 1, or 0.5 minutes) occurs on a time scale of longer than 2, 1, or 0.5 minutes, respectively. Hence, any predetermined period may be chosen, especially based on the type of horticulture (see also elsewhere), if such predetermined time period has a value of 5 minutes, or optionally less.

One could say that in an embodiment the control unit is configured to prevent a change from one average PPFD level (over a certain period of time) to another average PPFD level (over a certain period of time), when the difference between the two average PPFD levels is larger than the indicated threshold (such as 50 µmol/sec/m²), when such change (to bridge the difference) takes place within the predetermined period of time (such as within 5 minutes or smaller). Would such change be smeared out such that the increase or decrease is smaller than the threshold value over the predetermined time, than the control unit may not need to adapt the contribution of the horticulture light. Likewise, this may be applied to the other indicated PPFD levels.

Hence, the control unit may be configured to prevent the herein (too large (and undesired)) indicated changes in PPFD when determined over a period longer than the predetermined period of time, such change would occur in a period shorter than the predetermined period of time. Of course, the control unit can be configured to extrapolate values and/or predict trends, and come in action to prevent the undesired change, when necessary. Hence, the invention does not exclude large intensity level changes; even more, the lighting system may be configured to include such large intensity changes or may be controlled according to a light recipe including such large intensity changes. However, such large intensity change is controlled in such a way, that the change is gradual. For instance, an increase of 200 µmol/sec/m² may take place in a time window of e.g. 4*5 minutes or larger. Thus, the (large) change may probably be intentionally and should be implemented, although at a lower pace. Hence, to give a further example: a quick and large change followed by a quick correction to the original level, e.g. switching off and on control light within 5 minutes, may not be a problem, assuming the predetermined period of time to be 5 minutes; compensation of the light intensity by the lighting system may however be necessary as within the 5 minutes, the control light would not be switched on again.

For some crops, the 50 µmol/sec/m² (change) may even be a too large value, and the crop may already start changing internal processes when the change is e.g. above 20, or even already above 5 µmol/sec/m². Hence, a specifically safe range may be when the control unit is configured to prevent a change in the photosynthetic photon flux density (PPFD) of the local light at the location within the horticulture production facility of on average more than 5 µmol/sec/m² over the predetermined period of time. Alternatively or additionally, ranges may include shorter time barriers. Hence, in embodiments, the predetermined period of time is selected from the range of equal to or smaller than 2 minutes.

The term "change", herein thus especially relates to a permanent or semi-permanent change. For instance, would the photosynthetic photon flux density change within e.g. 1 sec. with −200 µmol/sec/m² followed by an increase within e.g. 5 seconds with +190 µmol/sec/m², this would imply a net change of 10 µmol/sec/m², well within the indicated 5 minutes. Such changes may not be noticed by the crops and may not lead to plant stress (and thus, do not need to be compensated). Therefore, the term "on average" is used; when there is on average, in the indicated period of time, a not too large increase of decrease in PPFD, then the plant may not be stressed. This especially relates to the "average change" or "change on average" (during said period).

The wavelength range is chosen to be 400-800 nm, which includes the PAR region. In the field of application of light in horticulture, intensity is counted in photons, and each photon in the indicated ranges counts equally in photosynthetic activity. As below 400 nm also relevant plant processes may take place, in further specific embodiments the control unit is configured to prevent a change in the photosynthetic photon flux density (PPFD) within the wavelength range of 300-800 nm of the local light at the location within the horticulture production facility of on average more than 50, such as especially more than 20, or even on average more than 5 $\mu mol/sec/m^2$ over the predetermined period of time. Hence, in an embodiment the PPFD is determined within the wavelength range of 300-800 nm.

It may also not be desirable to have a substantial change in spectral light distribution. Hence, with the lighting device allowing the spectral light distribution of the horticulture light to be tunable, the control unit may also be configured to prevent a substantial change in the spectral light distribution of the local light at the location over the predetermined period of time, as defined herein, by controlling the contribution of horticulture light to the local light. By tuning the spectral light distribution of the horticulture light from the light sources, locally a spectral light distribution change, if considered too substantial, may be compensated.

In specific embodiments, the control unit is further configured to prevent a change in the spectral light distribution of the local light at the location of on average more than 20 $\mu mol/sec/m^2/(400\text{-}800 \text{ nm})$. For instance, assume a photosynthetic photon flux density change within 5 minutes of less than 20 $\mu mol/sec/m^2$, based upon intensity arguments only, then there might be no need for compensation. However, if for instance the photosynthetic photon flux density within the range of 400-500 nm would change more than 5 $\mu mol/sec/m^2$, i.e. (500-400 nm)/(800-400 nm)*20 $\mu mol/sec/m^2$, then the control unit may try to compensate this by changing the light output of this color.

In specific embodiments, the control unit is further configured to prevent a (substantial) change in the spectral light distribution of the local light at the location by controlling the contribution of the horticulture light to the local light to such an extent, that a change in the ratio of intensities (especially in terms of PPFD) between two or more wavelength ranges within the wavelength range of 400-800 nm of the local light maintains within 1:2 and 2:1, especially within 1:1.2 and 1.2:1, especially within 1:1.1 and 1.1-1, of the intensity of a predetermined wavelength range selected out of the two or more wavelength ranges. Assume for instance only two wavelength ranges, such as 400-600 nm and 600-800 nm, with a permanent or semi-permanent PPFD intensity ratio of 1:10. Then, a change to larger than 2:10 or smaller than 1:20 might be compensated (assuming the allowable change range 1:2 to 2:1 to be a desirable range).

Especially, three or more of such (sub)wavelength ranges can be defined, which may divide the wavelength range in three or more (optionally equal) parts. For instance, the wavelength range of 400-800 nm may be divided in two or more wavelength ranges, such as 400-500, 500-600, 600-700 and 700-800 nm. The intensity in one of these ranges, such as the range of 400-500 nm, may be used as a reference intensity. Any intensity change (in terms of PPFD) in the other ranges larger than *2 or /2 may then be compensated with the horticulture light (of the lighting device).

As especially some parts of the spectrum seem to be relevant for plants. Therefore, in a further embodiment, the control unit is (further) configured to prevent a change in the photosynthetic photon flux density (PPFD) in (one or more of) a first wavelength range of 400-470 nm of the local light at the location within the horticulture production facility of on average more than 10 $\mu mol/sec/m^2$ over the predetermined period of time (selected from the range of equal to or smaller than 5 minutes, etc.), in a second wavelength range of 625-675 nm of the local light at the location within the horticulture production facility of on average more than 10 $\mu mol/sec/m^2$ over the predetermined period of time (selected from the range of equal to or smaller than 5 minutes, etc.), and optionally in a third wavelength range of 675-760 nm of the local light at the location within the horticulture production facility of on average more than 10 $\mu mol/sec/m^2$, over the predetermined period of time (selected from the range of equal to or smaller than 5 minutes, etc.).

The control unit may in embodiments be a simple hardware based system with a capacitor, or a pulse width modulation based system, especially suited for LED-based light sources, or a programmed system.

Further, it may especially be desirable to locally measure the light intensity of the local light, and optionally also the spectral light distribution of the local light. Hence, in an embodiment, the lighting system further comprises a sensor (especially optical sensor), configured to sense the photosynthetic photon flux density (PPFD) of the local light at the location. The term "sensor" may also refer to a plurality of sensors. Especially, the horticulture production facility comprises a plurality of such light sensors. Each light sensor may be used to sense the light intensity of the local light, and optionally also the spectral light distribution of the local light, at a specific location. Or, in other words, the number of sensors may determine the number of locations. The phrase "configured to sense the photosynthetic photon flux density (PPFD) of the local light" indicates that the control unit, based on the sensor signal, can derive the photosynthetic photon flux density (PPFD) of the local light.

Further, in some embodiments, the control unit is further configured to control one or more of the intensity and the spectral light distribution of the local light at the location as a function of a predetermined light recipe by controlling the contribution of the horticulture light to the local light. Hence, the control unit may impose a light scheme or recipe and impose this in such a way, that each change occurs gradually.

In a further aspect, the invention also provides a lighting device (or luminaire) that may e.g. be applied in this method. The term "lighting device" may also refer to a plurality of lighting devices, which may all be controlled with the same control unit (see further below). In a further aspect, the invention provides a lighting device comprising a plurality of light sources, especially arranged in 2D array of light sources. In specific embodiments, the lighting device may be based on an open grid or mesh of LEDs with connecting wires, wherein the grid or mesh of LEDs defines a grid plane, and wherein especially the LEDs are configured to provide horticulture light in beams of light having optical axes perpendicular to the grid plane (see further also below). The orientation of the LEDs may, in embodiments, alternate between sending light from a front (F), or first side, and from a back (B), or second side, of the grid plane. Hence, subsets (or LED arrangements) of the total number of LEDs may be configured anti-parallel with respect to each other (see further also below). Note that front and back can—dependent upon the configuration—be interchanged. Further, in embodiments, the LEDs may be grouped such that the driving voltage may be kept constant irrespective the size of the LED grid. Especially, in embodiments, the LEDs in the grid may emit different colors of light. All LEDs emitting a certain color may be arranged in a sub-grid (subset) and sub-grids may be interweaved to maximize illumination uniformity. In embodiments, the LEDs and current wires are covered with a transparent plastic or foil e.g. sandwiched between two sheets of plastic with holes at appropriate locations corresponding with openings in the grid.

Next to the fact that the lighting devices, or more especially the light sources, may be configured to be located in between the (future) crops, the lighting device may also be applied as a top lighting device for multi-layer growth. This concept may thus be applied in inter-lighting but also in other types of lighting, such as top lighting, including multi-layer lighting (see below). Hence, the invention is not limited to inter-lighting applications.

The lighting device, especially the grid, may span an area of for instance 0.5-400 m$^2$, such as 2-400 m$^2$. The number of light sources, especially LEDs, per m$^2$ (LED density) may for instance be in the order of 1-400, such as 4-100, though there may be grids with more or even with less light sources, especially LEDs, per square meter. Note that the distribution of the light sources, especially LEDs, over the lighting device, such as e.g. a grid, may be regular or may vary in different areas in the grid. In general, the light sources, especially LEDs will be arranged in a regular pattern, though other patterns may not be excluded. The device may comprise for instance at least 16 light sources, especially LEDs. In embodiments, the device comprises n×m LEDs, wherein n is at least 4, and m is at least 4, such as at least 10. In embodiments, the light sources, especially LEDs, are configured to provide light in one direction, e.g. light emanating from one side of a lighting device, such as a grid-based lighting device. This may for instance be of interest for top lighting. In other embodiments, the light sources, especially LEDs, are configured to provide light in two substantially opposite directions, e.g. light emanating from two sides of a lighting device, such as a grid-based lighting device. This may for instance be of interest for inter-lighting.

The LEDs are especially solid state LEDs, but may optionally also be organic LEDs. Also combinations of solid state and organic LEDs may be applied. The term "LED" may also relate to a plurality of LED dies. Hence, in embodiments, at a single LED position, a plurality of LED dies may be arranged, such as a LED package of 2 or more LED dies. The term "LED" may also relate to a LED package.

The advent of solid state lighting based on LEDs offers opportunities for application in horticulture. The main advantages of using LEDs result from the possibility to control the spectral composition of the light to closely match the plant's photoreceptors' sensitivity. Together with additional benefits like improved heat control and freedom of distributing the LEDs across the horticulture application area, this provides a more optimal production and enables influencing the plant's morphology and composition. It also promises a reduced energy consumption (and associated cost).

Solid state LEDs are easily integrated into digital control systems, facilitating lighting programs such as "daily light integral" lighting and sunrise and sunset simulations. LEDs are safer to operate than current lamps because they do not have glass envelopes and do not contain mercury.

LEDs enable one to distribute the light closer to the target which can result in less loss through the roof and into the floor of the greenhouse. Moreover a better light distribution across the crop can be accomplished. This is certainly the case for high-wire crops like tomatoes.

One or more LEDs may comprise converter material(s), such as one or more of an inorganic dye and an organic dye, for at least partially converting the LED light into light having another wavelength.

The lighting device may be a flexible lighting device. For instance, it may be a flexible (2D) wire grid or a flexible mesh. The lighting device may suspend from a roof or ceiling, or may be provided in a frame (such as between rails that may also be used as or include electrical conductors), etc. (see also above).

In embodiments, the plurality of light sources, especially light emitting diodes, comprise two or more independently controllable subsets of light emitting diodes. The two or more subsets are independently controllable, such as by the control unit (see also below). In this way, the on-off status, and optionally the intensity and/or optionally the color, of the two or more subsets may individually be controlled. The light sources, especially LEDs may be arranged in and/or on a (conductive) wire grid. In embodiments, the first subset comprises a plurality of light sources, especially light emitting diodes. In another embodiment, the second subset comprises a plurality of light sources, especially light emitting diodes. In yet another embodiment, the first subset comprises a plurality of light sources, especially light emitting diodes, and the second subset comprises a plurality of light sources, especially light emitting diodes. The invention also relates in some embodiments to a method and/or device wherein the plurality of light sources, especially light emitting diodes, comprises two or more independently controllable subsets of light sources, especially light emitting diodes, wherein at least two of said subsets are configured to generate light having different spectral distributions. As in embodiments, different subsets of the plurality of light sources, especially LEDs may provide different types of light such that the spectral distribution may be tuned to the needs of the horticulture processes.

The light sources used herein are especially configured to provide at least light in the range of 400-475 nm and 625-800 nm, especially 625-730 nm, such as 625-700 nm. Hence, to be able to locally vary the light intensity (in terms of PPFD) and/or spectral light distribution, it is especially desirable that the lighting systems comprises a plurality of lighting devices and/or a plurality of light sources, which are independently controllable. Controllable herein may especially refer to the controllability of the light intensity and/or the spectral light distribution, respectively.

In a further aspect, as also indicated above, the invention also provide a horticulture production facility comprising a lighting system, the lighting system comprising (i) a lighting device comprising a plurality of light sources configured within the horticulture production facility, and configured to illuminate with horticulture light crops within said horticulture production facility, wherein the lighting system further comprises (ii) a control unit which is configured to control the light intensity of local light at a location within the horticulture production facility, wherein the local light is the sum of the horticulture light and light at the location originating from an optional other light source, and wherein the control unit is configured to prevent a change in the photosynthetic photon flux density (PPFD) of the local light at the location within the horticulture production facility of on average more than 50, especially on average more than 20, such as on average more than 5 $\mu$mol/sec/m$^2$ over a predetermined period of time selected from the range of equal to or smaller than 5 minutes by controlling the contribution of the horticulture light to the local light, wherein the photosynthetic photon flux density (PPFD) of the local light is determined in total number of photons within the wavelength range of 400-800 nm per second per unit of area of the local light receiving area.

Especially, in some embodiments the horticulture production facility horticulture production facility comprises a plurality of sensors, configured to sense the photosynthetic photon flux density (PPFD) of the local light at a plurality of locations within the horticulture production facility. Especially, the control unit is configured to prevent changes in the photosynthetic photon flux densities (PPFD) of the local light at the plurality of locations. For instance, the horticulture production facility can comprise 1 or more sensors per 100 m$^2$ (production area), or even 1 or more sensor per 25 m$^2$, or even 1 or more sensor per 9 m$^2$. Assuming 1 sensor per 9 m$^2$, each 9 m$^2$ production area might be assigned, if desired, as location.

As indicated above, the horticulture production facility horticulture production facility may for instance comprise a greenhouse or a horticulture production facility having a multi-layer growth system (multi-layer growth horticulture production facility).

Further, any embodiment of the lighting system described herein may be used in the horticulture production facility.

With e.g. the lighting system of the invention, the light intensity and optionally also the spectral light distribution can be imposed to change only gradually. Hence, in a further aspect, the invention also provides the use of a method of providing horticulture light to a crop in a horticulture production facility comprising providing said horticulture light to said crop, wherein when the light intensity of the horticulture light is changed, this change only occurs by gradually increasing or decreasing with time. Especially, such use may also take into account the presence of light originating from other optional (external) light sources, such as the sun. Hence, in further specific embodiments the method further includes adapting the light intensity of the horticulture light to one or more of (a) the light intensity of additional light irradiating the crop originating from an optional other light source, (b) a horticulture light recipe and (c) the cardinal position of a light source providing said horticulture light. As indicated above, this may be used for reducing stress in the crop. In a specific embodiment, the invention allows to anticipate the cloud coverage and compensate for that in advance, based on a feed forward loop.

The invention also provides a lighting system comprising (i) a lighting device comprising a plurality of light sources for application in a horticulture production facility comprising said lighting device, wherein the horticulture production facility has a base area, wherein the light sources are configured to illuminate with horticulture light crops within said horticulture production facility, wherein the lighting system further comprises (ii) a control unit which is configured to control the light intensity of local light at a location within the horticulture production facility, wherein the local light is the sum of the horticulture light and light at the location originating from an optional other light source, and wherein the control unit is configured to prevent a change in the photosynthetic photon flux density (PPFD) of the local light at the location within the horticulture production facility of on average more than 20 $\mu$mol/sec/m$^2$ over a predetermined period of time selected from the range of smaller than 5 minutes by controlling the contribution of the horticulture light to the local light, wherein the photosynthetic photon flux density (PPFD) of the local light is determined in total number of photons within the wavelength range of 400-800 nm per second per unit of area of the base area.

The invention also provides a lighting system comprising (i) a lighting device comprising a plurality of light sources for application in a horticulture production facility comprising said lighting device, wherein the horticulture production facility has a base area, wherein the light sources are configured to illuminate with horticulture light crops within said horticulture production facility, wherein the lighting system further comprises (ii) a control unit which is configured to control the light intensity of local light at a location within the horticulture production facility, wherein the local light is the sum of the horticulture light and light at the location originating from an optional other light source, and wherein the control unit is configured to prevent a change in the photosynthetic photon flux density (PPFD) of the local light at the location within the horticulture production facility of on average more than xx $\mu$mol/sec/m$^2$ over a predetermined period of time selected from the range of smaller than 5 minutes by controlling the contribution of the horticulture light to the local light, wherein the photosynthetic photon flux density (PPFD) of the local light is determined in total number of photons within the wavelength range of 400-800 nm per second per unit of area of the base area, wherein xx is selected from the group consisting of 50, 20 and 5, and wherein especially the control unit may be configured to prevent the herein (too large (and undesired)) indicated changes in PPFD when such change would occur in a period shorter than the predetermined period of time. Further, also a horticulture production facility comprising such lighting system is provided.

Especially, the control unit is configured to prevent a change from one average PPFD level (over a certain period of time) to another average PPFD level (over a certain period of time), when the difference between the two average PPFD levels is larger than the indicated threshold (such as 50 $\mu$mol/sec/m$^2$), when such change (to bridge the difference) takes place within the predetermined period of time (such as within 5 minutes or smaller).

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 2h schematically depict some aspects of the invention.

The drawings are not necessarily on scale.

DETAILED DESCRIPTION OF THE EMBODIMENTS

Figure 1A:
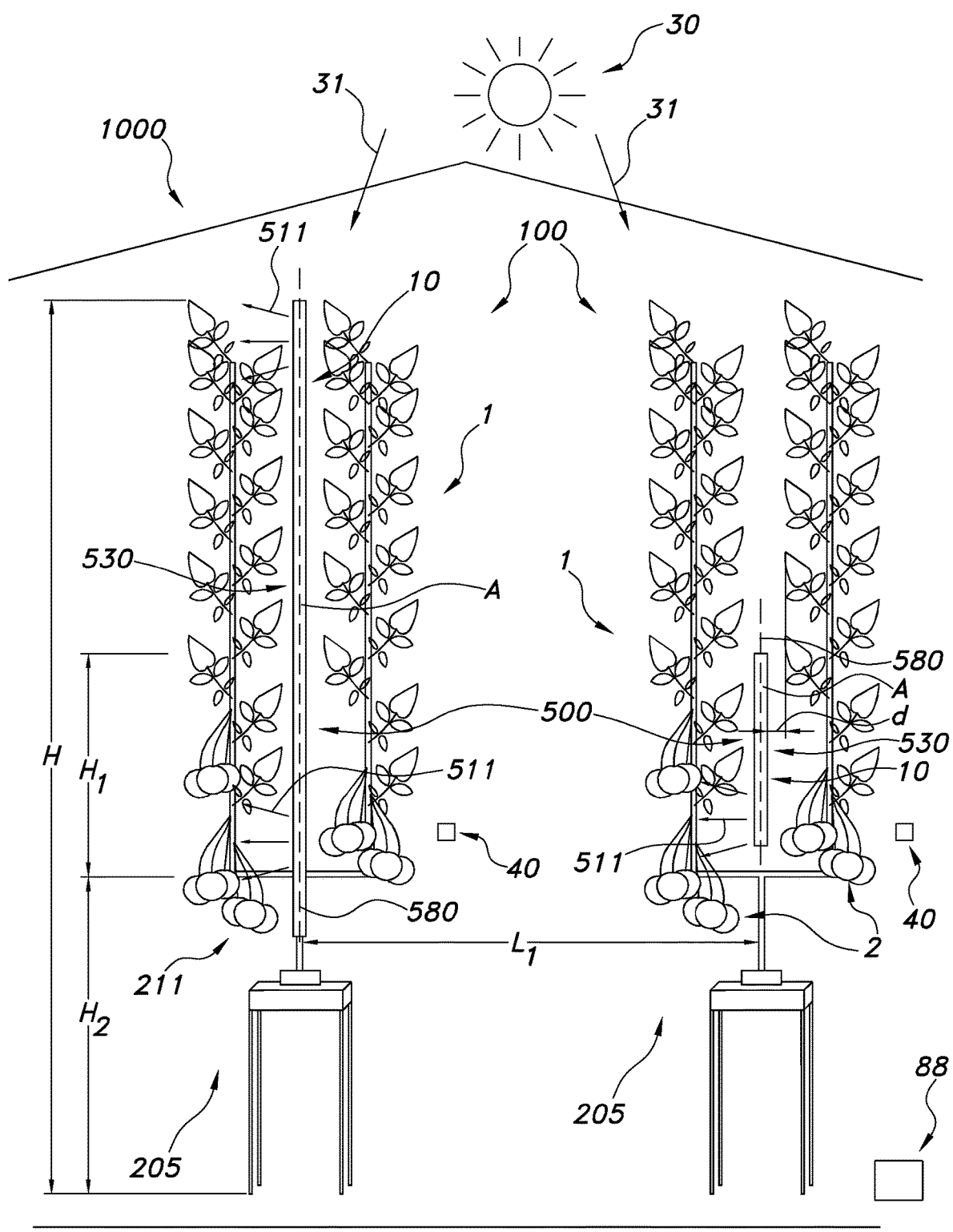
FIGS. 1a-1f schematically depict some horticulture applications and lighting devices.
Figure 1B:
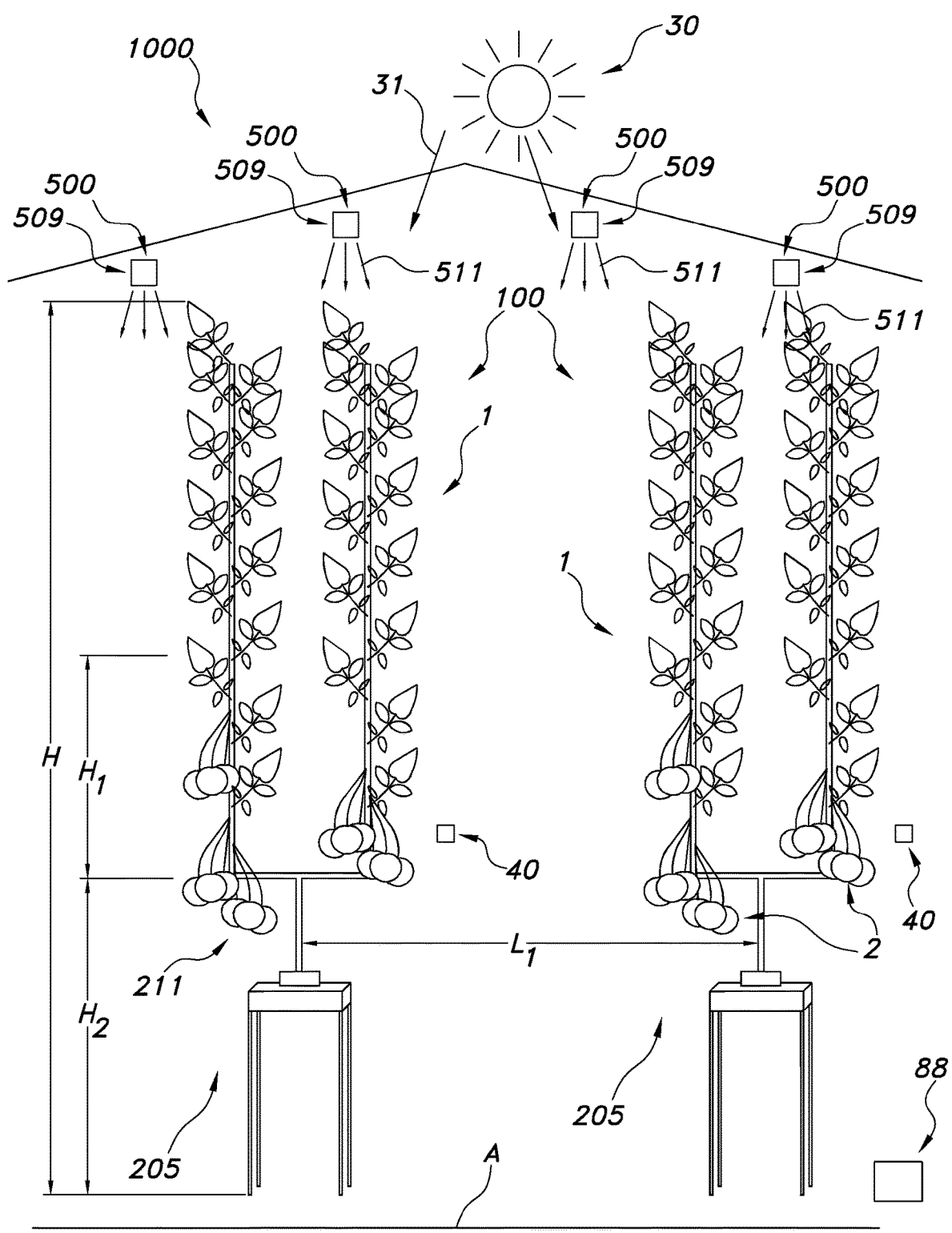

FIG. 1a schematically depicts a greenhouse for high wire crops e.g. tomato growth. The horticulture crop is indicated with reference 1. By way of example, the possible fruit(s) or edible plant part(s) are tomatoes in the depicted case. The tomato crop is only used as example to illustrate some aspects. The fruit area of the plant(s) is further indicated with reference numeral 2.

The crops or tomato plants are arranged in rows. The interdistance between the rows, and hence between the plants, is indicated with reference L1, and can for instance be in the range of 1-2 m, such as 1.5 m. The total height from ground level, indicated with reference H may e.g. be in the range of 2-4 m, such as about 3 m. The part of this total height which is especially relevant for horticulture lighting may cover a height H1, and is in the range of 0.5-1 m, and is about a height H2 above ground level, which height H2 may be in the range of 0.5-1.5 m, especially about 1 m. At least part of the height H may also be illuminated from the top (daylight and/or artificial). The lighting device, indicated with reference 500, may especially address the horticulture crop over said height H1; however, on the left side of the drawing a relative high lighting device 500 is shown, just by way of example. Reference d indicates the distance between the (light emitting surface of the) lighting device 500 and the crop 1. Reference 511 indicates the horticulture light that may be generated by the lighting device 500. As indicated above, over the height and/or the length of the lighting device 500, the horticulture light 511 may differ in intensity and spectral distribution. The lighting device(s) 500 comprise at least one light source, which is indicated with reference 10.

In FIG. 1a, reference 1000 indicates horticulture production facility, such as a greenhouse, being an example of a horticulture production facility. A plurality of rows of crops 1 may be indicated as the horticulture arrangement.

The device 500 may comprise a plurality of light emitting diodes. This plurality of light emitting diodes may comprise in embodiments two or more independently controllable subsets of light emitting diodes (see below). Two or more of said subsets can be arranged at different heights. In this way, horticulture light 511 may be provided to the crop(s) 1 as function of e.g. the height of the crop 1, by controlling the subsets accordingly.

The lighting device may comprise a grid or 2D arrangement of LEDs, which is further elucidated below. The grid is indicated with reference 530. The lighting device 500 may be rectangular or square, see also below, such as a grid. The lighting device has a plane, which is further indicated as a grid plane 580, which is in this drawing perpendicular to the plane of drawing, and has a front or first side and a back or second side. The first side and the second side of the lighting device 500, here especially the grid 530, are parallel with the grid plane 580, as illustrated in the FIGS. 2f-2i. Note that the first and/or the second side are not necessarily flat, as the grid may for instance comprise a wire mesh with LEDs arranged thereon. The horticulture light 511 may emanate from the first and/or the second side of the lighting device, here especially the grid 530.

Reference 30 indicates an optional light source, such as the sun, which may provide radiation or light 31, which may in greenhouses 1000 also be used to illuminate the crops. Hence, the local light indicated with reference 211, at locations 205, may be a sum of the horticulture light of the lighting device(s) 500, especially the light source(s) 10, and from the optional light 31 of the optional light source 30.

Reference A refers to the horticulture production area of the greenhouse 1000. The local light receiving area or a first location 205 (left in the figure), may be the area of a vertical plane parallel to the row of plants or crops 1, having a height of the mean height of said plants or corps 1, and having a length of the row (perpendicular to the plane of the drawing). By determining this area, and the intensity of the light of the light sources that may illuminate the area, the PPFD may be determined. Likewise, this may be applied for another location 205, at the right side of the drawing.

Reference 88 indicates a control unit, which is, next to the lighting device 500, comprised by the lighting system, which is indicated with reference 100. Reference 40 refers to a sensor, which may be used to sense the intensity (in terms of PPFD) at the locations 205. The control unit can, based on the input of the sensors 40, adapt the contribution of the horticulture light 511 at a specific location.

FIG. 1a schematically depicts a greenhouse 1000 wherein inter lighting is applied. However, alternative to inter lighting or in addition to inter lighting, also top lighting may be applied. Such embodiment is schematically depicted in FIG.

1b. Here, the local light receiving area may be determined from the effective plant production area of the base area.

Figure 1C:
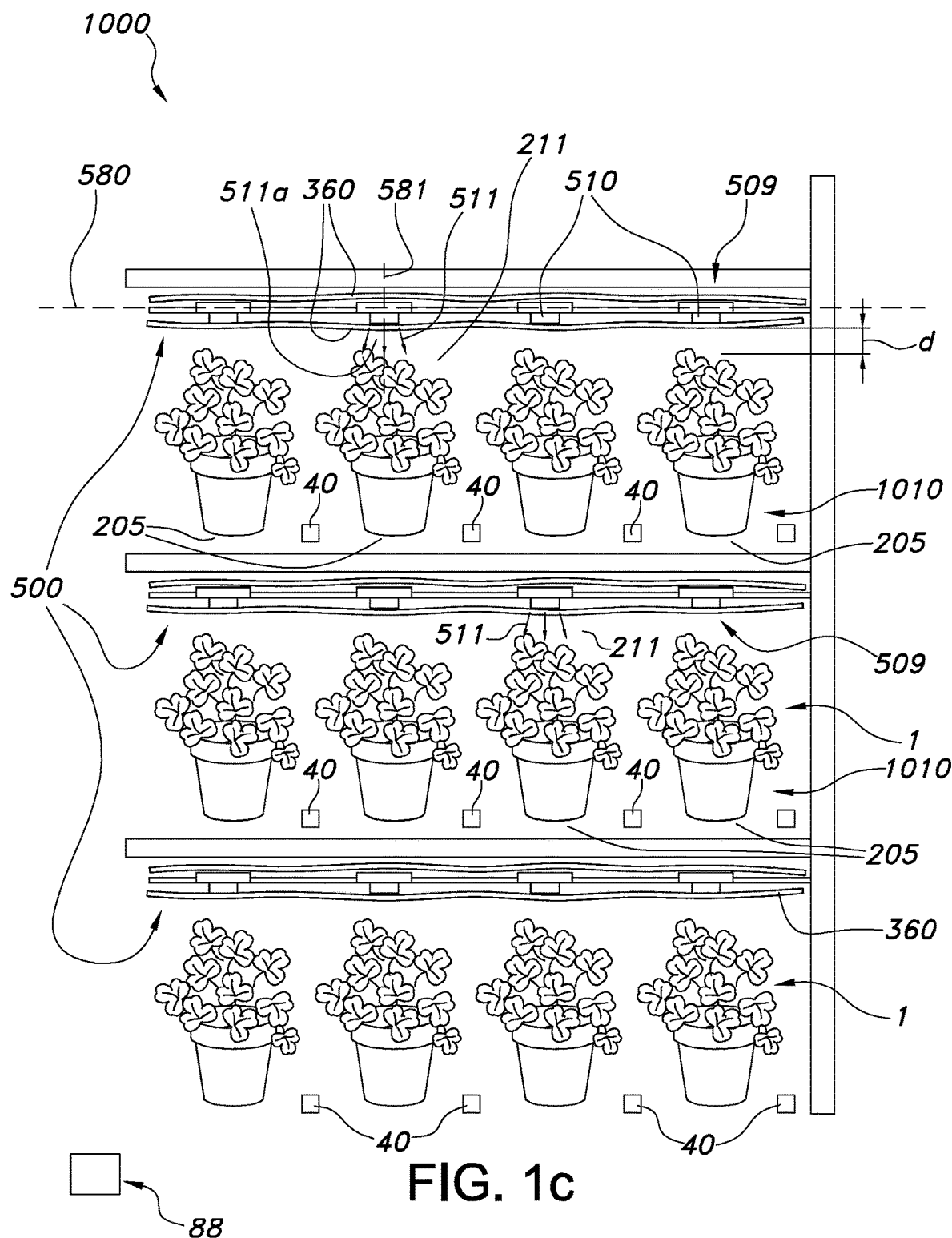

Another embodiment will be discussed next with reference to FIG. 1c. In this embodiment, the lighting device 500 as described herein, is used for multi-layer growth in a multi-layer horticulture production facility 1000. The multiple layers are indicated with references 1010. In this case it is beneficial that all LEDs emit in the same direction towards the plants. In this case, it may be advantageous to sandwich the LED grid in between two foils. This enables an LED grid that is mechanically more robust and better shielded from the humid environment present in plant factories. Preferably, the foil at the back of the LEDs is made diffuse reflecting by incorporating a layer that contains a white paint based on particles such as $TiO_2$. The advantage is that light that is reflected by the plant back to the light source is recycled. The foil is indicated with reference 360. The LEDs of the device, which are depicted in more detail in further figures, emit beams of light, which beams are indicated with reference 511a. These beams have optical axes 581. As can be seen in the figure, the optical axes are perpendicular to the grid plane.

Here, the lighting device is especially described with the embodiment of the grid 530; however, also other embodiments are possible (see also below). Further, the lighting device 500 comprises light sources 509, which may especially be LEDs, which are indicated with references 510. Here, the local light receiving area refers to the base area of a multi-layer, as each multi-layer has its own lighting device(s) and or own plurality of light sources and hence the local light is controlled per layer or shelf.

Figure 1F:
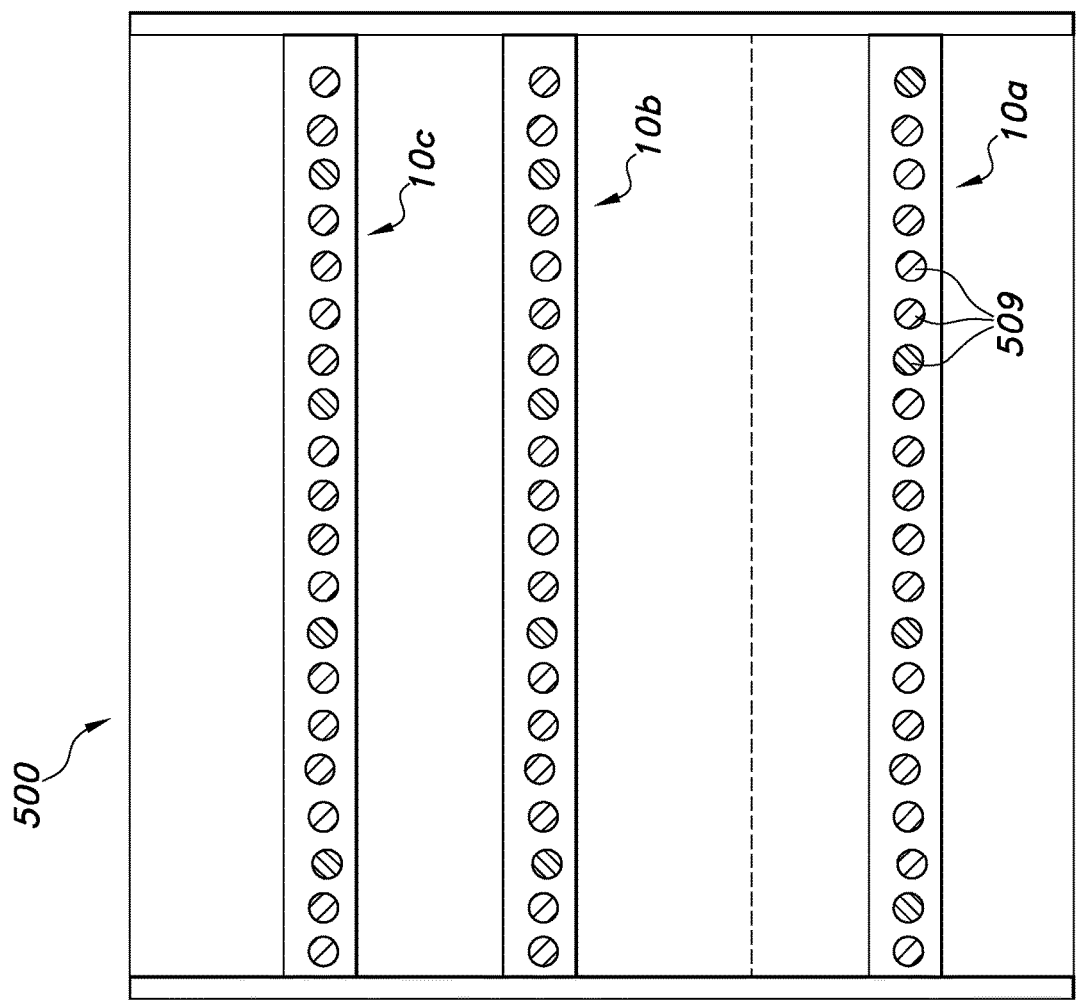
Figures 1D, 1E:
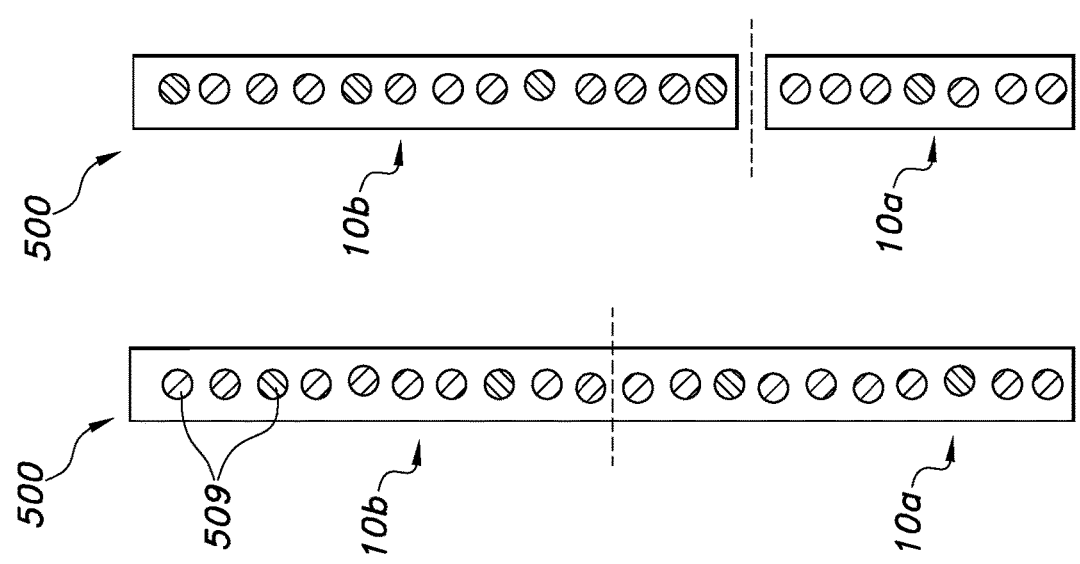

Further embodiments of lighting systems are schematically depicted in FIGS. 1d-1f. These figures schematically show an embodiment of possible lighting devices that are based on a linear array of LEDs emitting a beam in the forward direction (out of the plane of the paper). The lighting devices 500 may be located in between two rows of crops (see FIG. 1a). The lighting devices can be arranged horizontally or vertically. The lighting devices have in these embodiments a linear array of LEDs at the front as well as on the back in order to illuminate two opposing rows at the same time.

It should be noted that during periods wherein the daylight entering a greenhouse is insufficient for proper crop growth, not only the lower part of the crops (e.g. the fruit area) but also the upper part of the crops (e.g. the leaves) are illuminated with horticulture light; supplemental lighting thus has to be provided also to the middle and higher parts of the plant. In the embodiment we therefore have lighting devices in between the top and the bottom of the plants such that the light fluence and the spectrum can be set independently in at least two height regions (e.g. a lower region and a higher region). This can be done in several ways.

For example, in FIG. 1d there is a single lighting device that is vertically oriented but divided into two segments or subsets 10a, 10b that can be addressed individually (in fluence and/or spectrum). In 1e, two lighting devices that can be addressed individually, which is in fact equivalent to a single lighting device with two subsets of light sources 509, like LEDs. In 1f, there are three lighting devices, which is in fact equivalent to a single lighting device with three subsets of light sources 509, like LEDs, that are arranged horizontally. The lowest one can be addressed separate from the upper two. Note that the lowest one may have an installed ratio of red:blue LEDs that differs from the upper two, thereby providing a different spectral distribution by installation. Alternatively, the light sources of the subsets of light sources may be addressed individually. This may allow adapting the spectral distribution of the horticulture light to the demand of the crops and/or fruits.

Figure 2A:
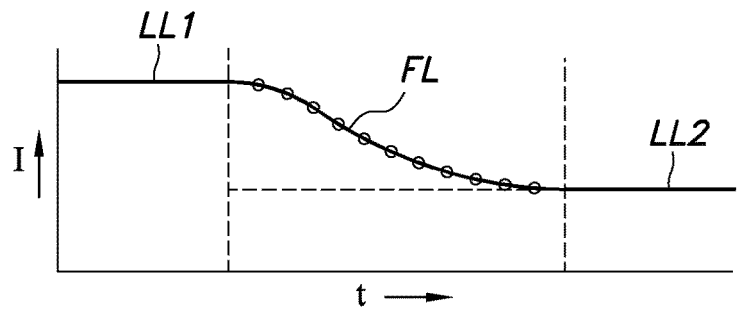
FIGS. 2a-2g schematically depict some lighting schemes.

FIGS. 2a-2f schematically depict some possible aspects of the invention. These figures show local light intensity (I) on the vertical axis versus time (t) on the horizontal axis. FIG. 2a shows a situation where the light level in a first time period, indicated with reference LL1 is set to change to a lower light level in a next time period indicated with LL2. The dashed line between LL1 and LL2 indicates what would happen if the lighting system would simply follow the instruction: "go to light level LL2". A sudden drop in light intensity would be perceived by the plants, which may lead to stress. Hence, the lighting system provides follow light FL, indicated with the line with dots, which provides a gradual decrease to the desired lower level LL2.

FIG. 2a and following figures especially depict that the control unit may be configured to prevent too large (and undesired) changes in PPFD when such change would occur in a period shorter than the predetermined period of time. Especially, the control unit prevents a change from one average PPFD level (over a certain period of time) to another average PPFD level (over another certain period of time), when the difference between the two average PPFD levels is larger than the indicated threshold (such as 50 µmol/sec/m$^2$), and when such change (to bridge the difference) would take place within the predetermined period of time (such as within 5 minutes or smaller). Of course, the control unit can be configured to extrapolate values and/or predict trends, and come in action to prevent the undesired change, when necessary. The control unit may be configured to implement the indicated changes in PPFD gradually over a period of time longer than the predetermined period of time.

Figure 2B:
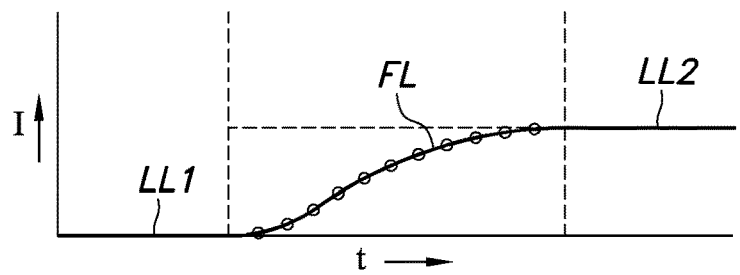

FIG. 2b schematically depicts a situation that e.g. a light recipe demands the increase from a lower level LL1 to a higher level LL2. Due to the lighting system, the follow light FL is provided which imposes a gradual change to the higher level LL2, instead of an abrupt intensity change to level LL2.

As will be clear to a person skilled in the art, the control unit 88 (see previous drawings), may be part of, be integrated in or implemented by a climate control unit. Alternatively or additionally, the control unit may also be integrated in the lighting device. Also the sensor(s) can be integrated in the lighting device.

Figure 2C:
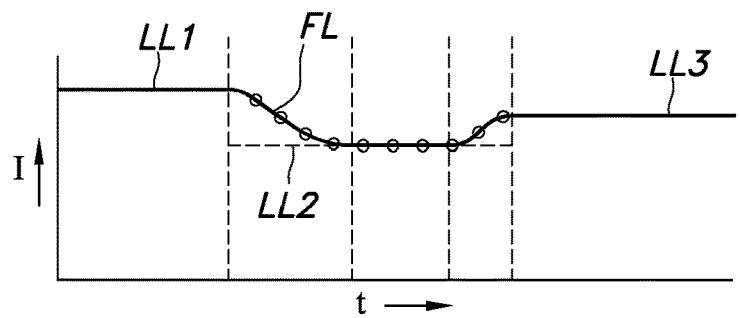

FIG. 2c schematically depicts a situation wherein e.g. LL1, LL2, and LL3 schematically depict three light levels of a light recipe. Again, the changes might be too large, and might have to be compensated with the follow light FL. The control unit controls the light of the lighting devices and ramps down and up with this "follow light", thereby reducing plant stress.

Figure 2D:
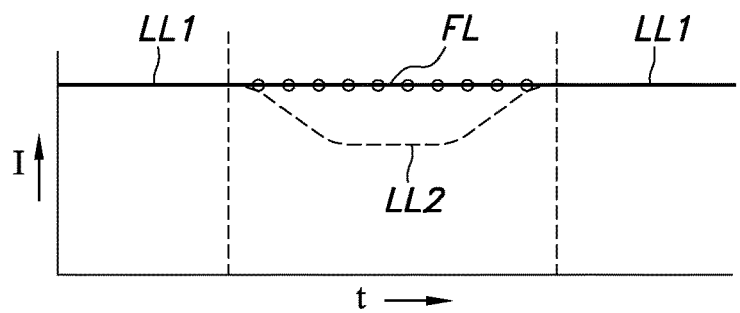

FIG. 2d schematically depicts a situation that the local light, here of light level LL1, being a sum of artificial horticulture light and optional solar light, is decreased for instance due to a strong reduction in the solar light (e.g. thunderstorm, etc.). As the control unit may be configured to provide light having an intensity LL1, the control unit may be configured to control the lighting system to increase the artificial horticulture light intensity to keep the local light level at LL1 during the period of lower light from the optional light source (here by way of example the sun).

Figure 2E:
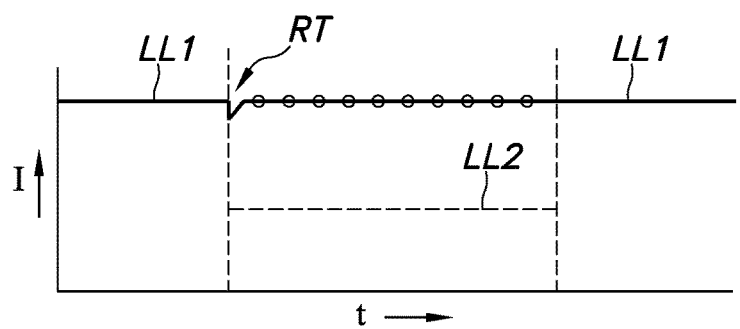

FIG. 2e schematically depicts a situation wherein the light level set is LL1, but wherein for some reason, for instance due to switching off an optional light source, the light level suddenly drastically reduces to a lower level LL2. The control system may immediately react by providing additional horticulture light to maintain the light level LL1. A small 'spike' in the light intensity will not be 'noticed' by the plants. After a period of time, the situation may be repaired, and the additional horticulture light is again reduced to maintain light level at LL1. Thus the lighting system temporarily resolves light intensity deficiencies by providing additional horticulture light.

Figure 2F:
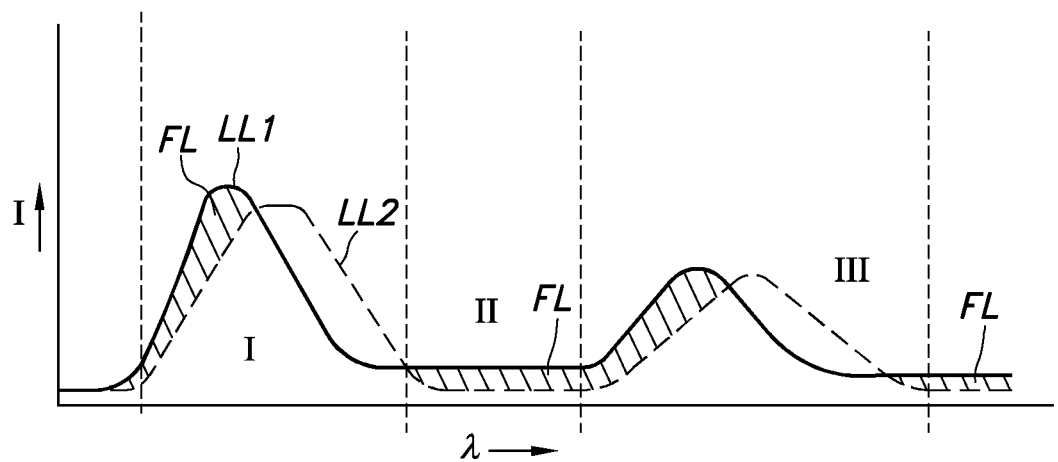
Figure 2G:
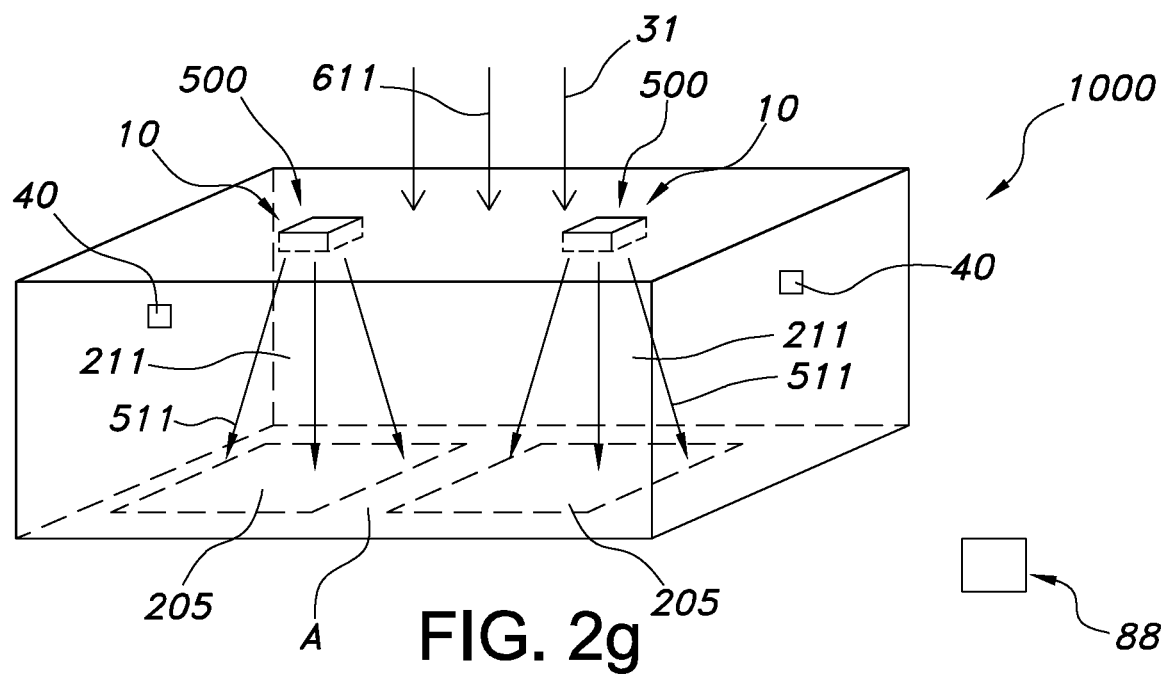

FIGS. 2f and 2g schematically depict situations wherein the spectral light distribution LL1 changes to a spectral light distribution LL2, which changes might be a too fast. In the FIGS. 2f and 2g, local light intensity (I) is shown on the vertical axis and wavelength (λ) on the horizontal axis. When the spectral light distribution change is imposed by the control unit (or a climate control unit), then the control unit may be configured to have this spectral distribution change performed gradually over all wavelengths. For example, the follow light of the lighting system may compensate, especially in those instances where there is a deficit in light intensity, by adding horticulture light of specific wavelengths or spectral distribution to the local light or removing horticulture light of specific wavelengths or spectral distribution from the local light, to gradually implement the change. In FIG. 2f for example, the follow light at least partially reduces the contribution of some wavelength ranges in the spectral light distribution to move the spectral light distribution LL1 closer to the spectral light distribution LL2.

By way of example, the spectral range is divided in a number or regions (here I-III). Optionally, compensation may depend upon the region. For instance, it may be more relevant to compensate in the 400-470 nm and 625-675 nm regions.

FIG. 2g schematically depicts a system wherein a first peak in the spectral light distribution substantially diminishes in intensity relative to a second peak. The control unit may be configured to prevent a (substantial) change in the spectral light distribution of the local light at the location by controlling the contribution of the horticulture light to the local light to such an extent, that a change in the ratio of intensities between two or more wavelength ranges within the wavelength range of 400-800 nm of the local light maintain within 1:2-2:1, especially within 1:1.2-1.2:1, especially within 1:1.1-1.1-1, of the intensity of a predetermined wavelength range selected out of the two or more wavelength ranges. Hence, by the follow light FL, the ratio between the first peak and the second peak, within the wavelength ranges I and II in relation to wavelength range III (taking range III as the predetermined wavelength range selected out of the two or more wavelength ranges) is restored (maintained). Of course, a gradual change to LL2 may occur. In other words, one wavelength range is chosen as reference wavelength range (predetermined wavelength range), and the ratio's of the intensities of other wavelength range(s) relative to the predetermined wavelength range is kept within the indicated range of especially 1:2-2:1, or even more tightly. The more wavelength ranges are chosen, the more precisely the spectral wavelength distribution can be controlled.

FIG. 2h schematically depicts a horticulture production facility 1000, with lighting system comprising a plurality of lighting devices 500 and/or comprising a plurality of light sources 10. These are configured to provide horticulture light 511. Schematically, two locations 205 are depicted. Sensors 40 may control the light intensity (PPFD) and/or spectral light distribution of the local light 211.

Hence, especially light output from LED lamps or modules changes gradually to reduce the light stress to plants. This includes the time delay of turning on and turning off as well as taking into account cardinal positioning of the luminaires.

Figure 3A:
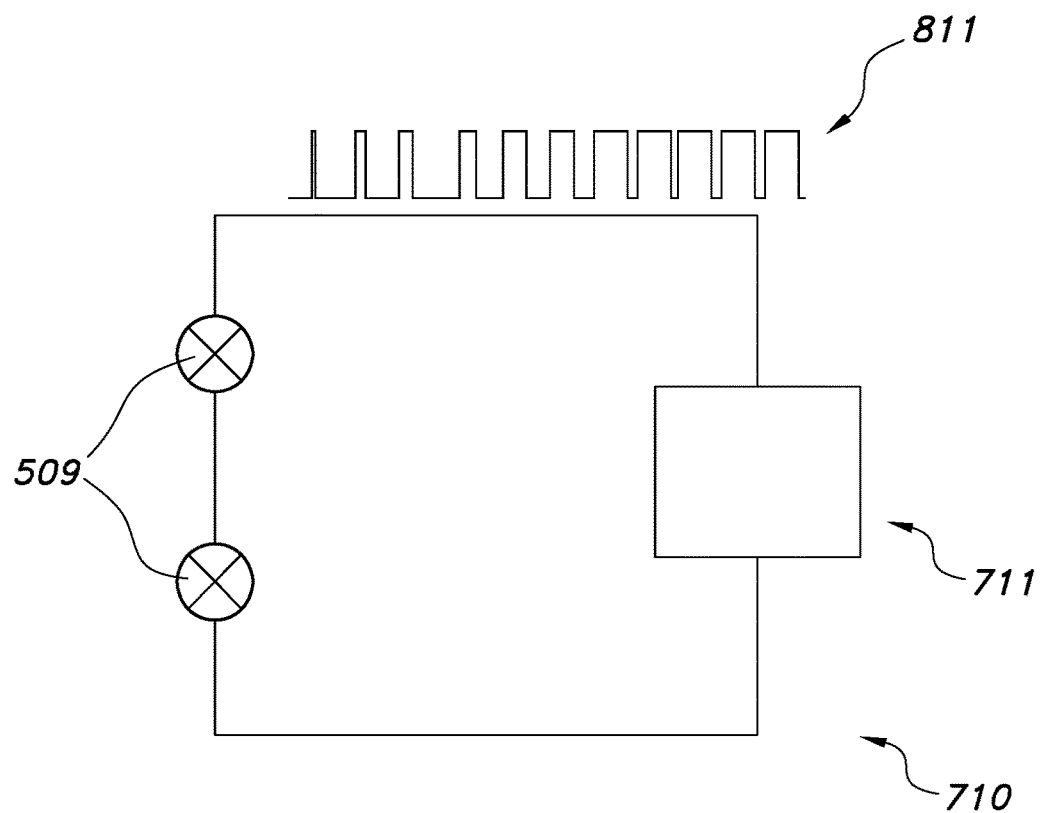
FIGS. 3a-3b schematically depict some possible control unit parts.

Assuming a LED based lighting device, a specific light driver may be applied. The LED driver may have a soft start function. In the case of PWM (pulse width modulation) driving of the LED light sources, an embodiment may include increasing the pulse width from 'off' (0%) gradually (via 1%, 2%, 3%, . . . ) towards a pulse width corresponding with the desired 'on' light intensity. Reversely, the pulse width decreases gradually from the 'on' value to 'off'. FIG. 3a shows a possible configuration. In practice, the dimming unit of the PWM driver may controlled via the central climate computer via a 0-10V signal to the dimming unit. A ramp on this 0-10 V signal can be programmed with a desired slope to avoid sudden intensity changes and therewith the induced plant stress. FIG. 3a schematically depicts such system, indicated with reference 710, wherein reference 711 indicates a LED driver with soft start, and wherein reference 811 schematically depicts the PWM signal generated by the LED driver, showing a slowly increasing pulse width to end at a desired 'on' pulse width providing the desired light intensity.

Figure 3B:
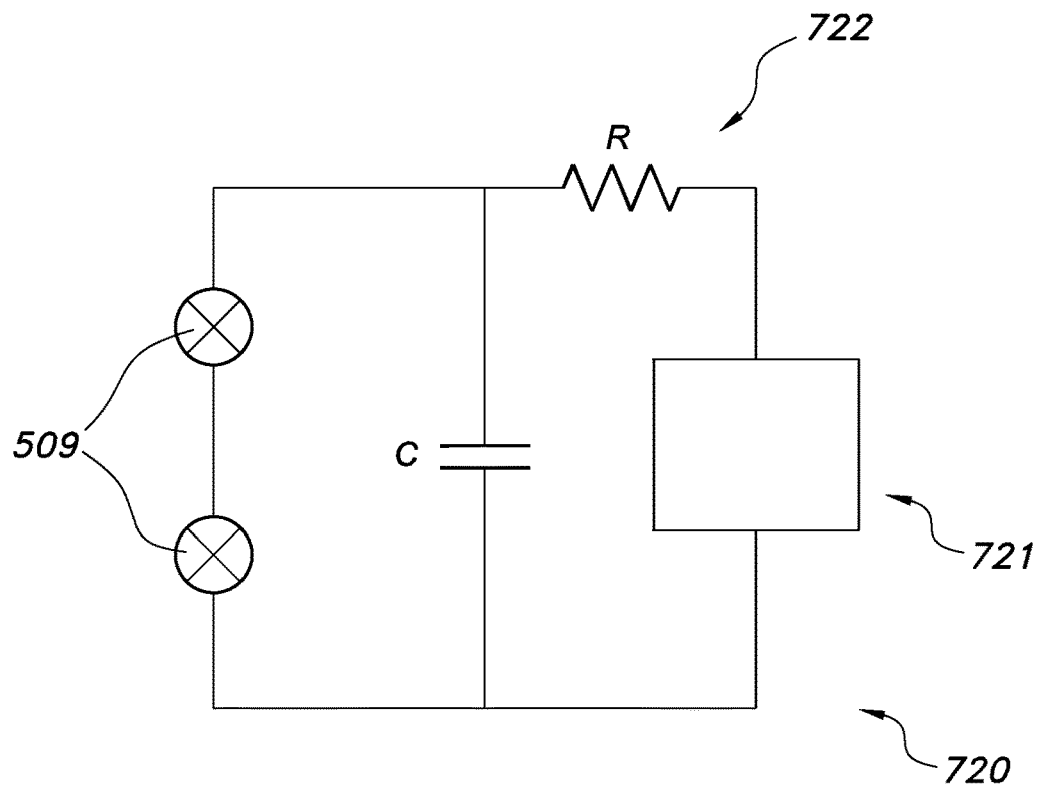

One simple embodiment in a non-PWM driven circuit is illustrated in FIG. 3b. One additional (optional) resistor R and one additional capacitor C are added between the LEDs and the power supply. In this way, when the power is turned on, the LEDs will be gradually turned on as the capacitor is being gradually charged. Reversely, the LEDs will not immediately be turned off when the power is cut off as the capacitor will sink power to LEDs.

Another embodiment is to use a micro controller to control the current running through the LEDs.

Most of the drivers are PWM drivers containing programmable options and options for sensor feedback. The programming of predetermined time periods, dimming up/down rates, maximum allowable intensity and/or spectrum changes etc. should preferably be adapted to the lighting environment of the plant, to the type of plant, the geographical position (latitude, longitude) such that sun position and illumination could be taken into account. Several programming features are listed below as an example going from simple to more complex:

Simple fixed intensity dimming on/off time ramp scaling in seconds, minutes or hour.

A programmed dimming on/off with a ramp (as above) depending on the day, month of the year to take length of day into account. Programming could be done using standard radiation models and could for example be used to mimic natural daylight programs in plant factories.

A programmed dimming on/off with a ramp (as above) depending on the longitude and latitude. Programming could be done using standard radiation models and could for example be used to compensate for geographical location difference between horticulture production facilities.

A programmed dimming on/off with a ramp including a switch indicating that the driver will operate a group of lamps oriented to the North, West, South and East (only relevant for plants using daylight illumination as well). Programming could be optimized to maintain similar natural daylight radiation specificities (like previously mentioned) or in the contrary make radiation more uniform in the greenhouse such that the effect of cardinal orientation is reduced (depending on the crop).

Sensor controlled driver ramp up/down: Another embodiment would be to have a sensor controlled ramp speed control. In this case each group of light sources should have an intensity sensor monitoring light changes locally. The driver would then compensate those changes with increasing or decreasing the current which goes through the LEDs in order that light perceived by the plant doesn't change too fast (like when the curtains of the greenhouse are closing or when a large cloud is passing).

In summary, this invention intends to minimize sudden light change to plants by controlling the artificial lighting in a horticulture production facility, resulting in less plant stress and an improved plant growth efficiency. As an additional result, the current supplying to the LEDs is gradually changed during the ON and OFF stages and the lifetime of LED chips can be potentially prolonged due to the reduced thermal and mechanical stress.

This invention can be used in current GreenPower LED modules from Philips for horticulture lighting. But also with other light sources (fluorescent, incandescent, OLED, laser light sources etc.).

The invention claimed is:

1. A lighting system comprising:
   a lighting device comprising a plurality of light sources for application in a horticulture production facility comprising said lighting device, wherein the light sources are configured to illuminate with horticulture light, crops within the horticulture production facility;
   wherein the lighting system further comprises a control unit which is configured to control a light intensity of local light at a location within the horticulture production facility, wherein the local light is a sum of the horticulture light and additional light at the location originating from a light source not comprised in the lighting device;
   wherein the lighting system further comprises a sensor, configured to sense the photosynthetic photon flux density of the local light at the location;
   wherein upon the sensor detecting a change in the photosynthetic photon flux density of the local light at the location, the control unit is configured to limit rate of the change by controlling the contribution of the horticulture light to the local light in a manner such that on average, the change of the photosynthetic photon flux density of the local light does not exceed 50 μmol/sec/m$^2$ over a predetermined period of time selected from a range of equal to or smaller than 5 minutes; and,
   wherein the photosynthetic photon flux density of the local light is determined as a total number of photons within a wavelength range of 400-800 nm per second per unit area of a local light receiving area.

2. The lighting system according to claim 1, wherein the control unit is configured to prevent a change in the photosynthetic photon flux density of the local light at the location within the horticulture production facility of, on average, more than 5 μmol/sec/m$^2$ over the predetermined period of time.

3. The lighting system according to claim 1, wherein the predetermined period of time is selected from the range of equal to or smaller than 2 minutes.

4. The lighting system according to claim 3, wherein the control unit is further configured to prevent a change in a spectral light distribution of the local light at the location by controlling the contribution of the horticulture light to the local light to such an extent, that a change in a ratio of intensities between two or more wavelength ranges within the wavelength range of 400-800 nm of the local light maintain within 1:2-2:1 of the intensity of a predetermined wavelength range selected out of the two or more wavelength ranges.

5. The lighting system according to claim 4, wherein the control unit is configured to prevent a change in the photosynthetic photon flux density within the wavelength range of 300-800 nm of the local light at the location within the horticulture production facility of, on average, more than 20 μmol/sec/m$^2$ over the predetermined period of time.

6. The lighting system according to claim 1, wherein the control unit is further configured to control one or more of the intensity and the spectral light distribution of the local light at the location as function of a predetermined light recipe by controlling the contribution of the horticulture light to the local light.

7. The lighting system according to claim 1, wherein the control unit is configured to prevent a change in the photosynthetic photon flux density in a first wavelength range of 400-470 nm of the local light at the location within the horticulture production facility of, on average, more than 10 μmol/sec/m$^2$ over the predetermined period of time, in a second wavelength range of 625-675 nm of the local light at the location within the horticulture production facility of, on average, more than 10 μmol/sec/m$^2$ over the predetermined period of time, and optionally in a third wavelength range of 675-760 nm of the local light at the location within the horticulture production facility of, on average, more than 10 μmol/sec/m$^2$ over the predetermined period of time.

8. A horticulture production facility comprising the lighting system according to claim 1.

9. The horticulture production facility according to claim 8, comprises a plurality of sensors, configured to sense the photosynthetic photon flux density of the local light at a plurality of locations within the horticulture production facility, wherein the control unit is configured to limit the change in the photosynthetic photon flux density of the local light at each of the plurality of locations.

10. The horticulture production facility according to claim 9, wherein the horticulture production facility comprises a greenhouse or a horticulture production facility comprising a multi-layer growth system.

11. The horticulture production facility according claim 8, wherein the control unit is further configured to prevent a change in the spectral light distribution of the local light at the location by controlling the contribution of the horticulture light to the local light to such an extent, that a change in the ratio of intensities between two or more wavelength ranges within the wavelength range of 400-800 nm of the local light maintain within 1:2-2:1 of the intensity of a predetermined wavelength range selected out of the two or more wavelength ranges.

* * * * *